March 7, 1933.   P. GERVASI   1,899,951
BURNER
Filed May 9, 1931   5 Sheets-Sheet 1
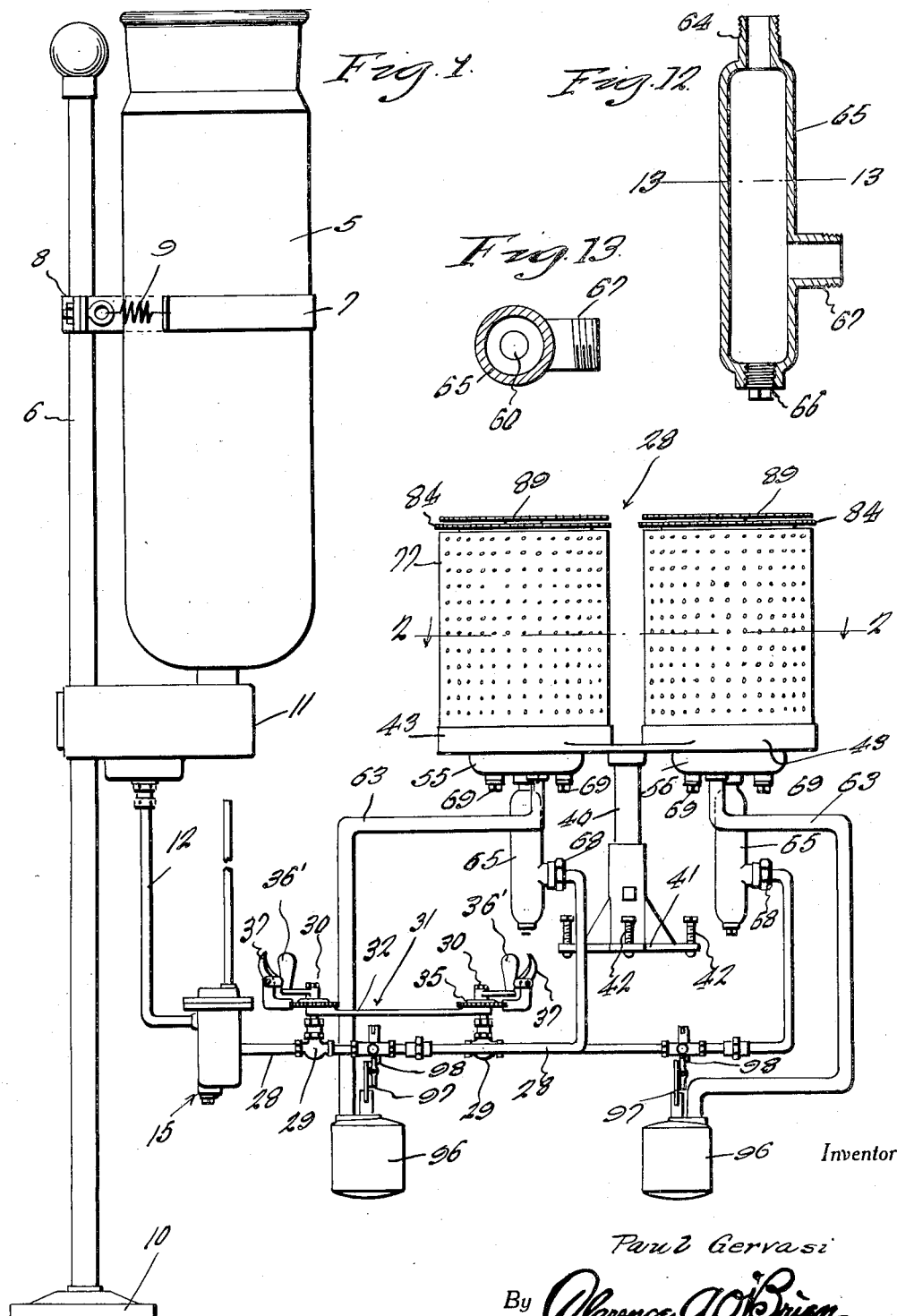

March 7, 1933.  P. GERVASI  1,899,951
BURNER
Filed May 9, 1931   5 Sheets-Sheet 2
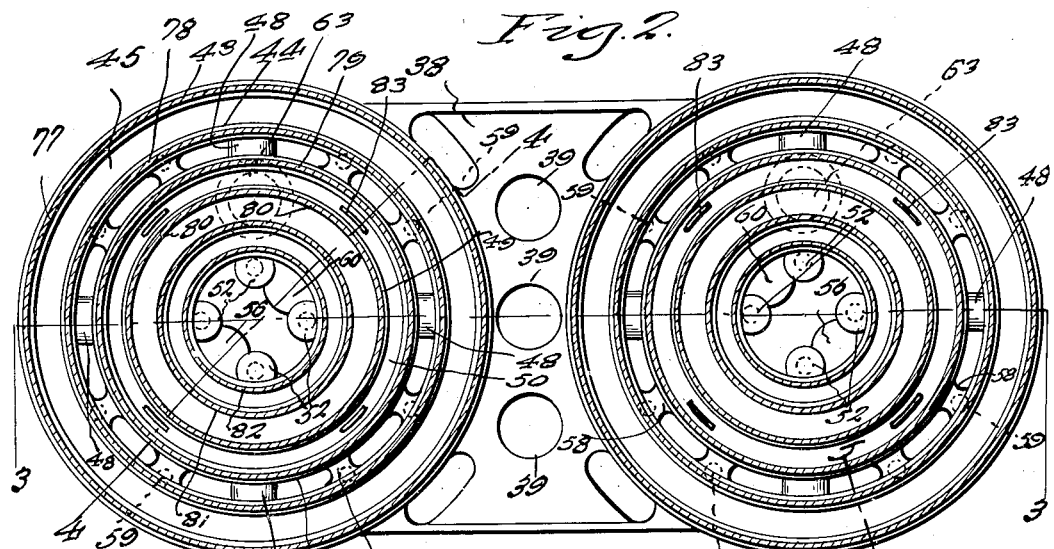
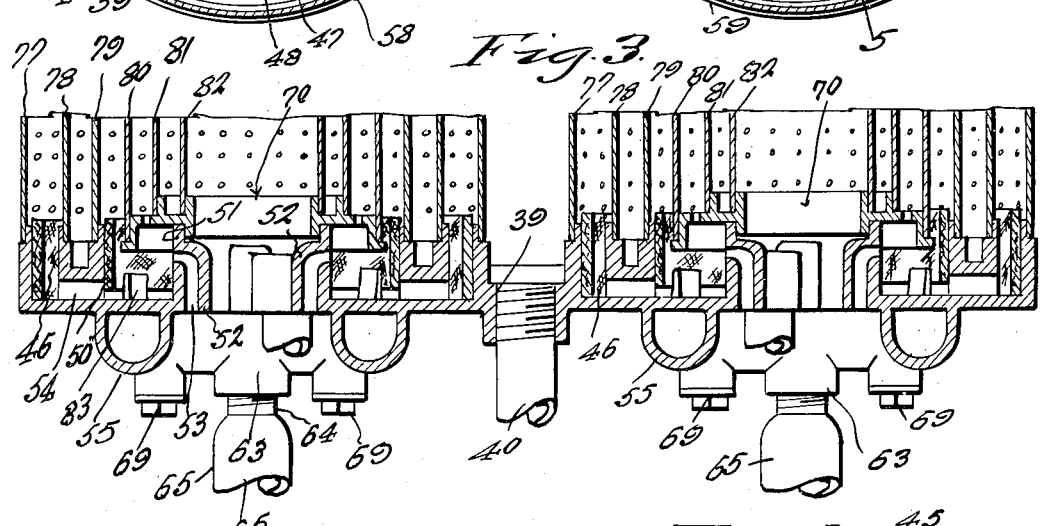
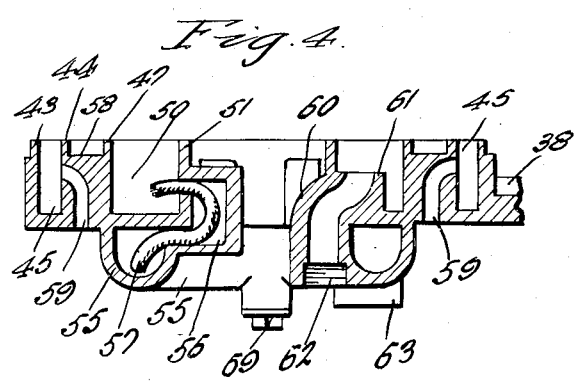
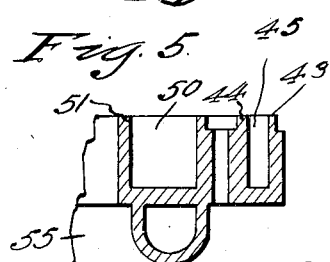
Inventor
Paul Gervasi
By Clarence A. O'Brien
Attorney

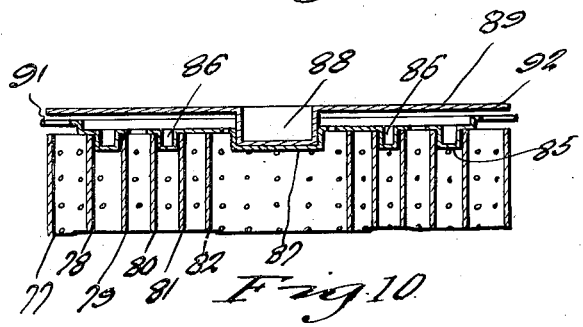
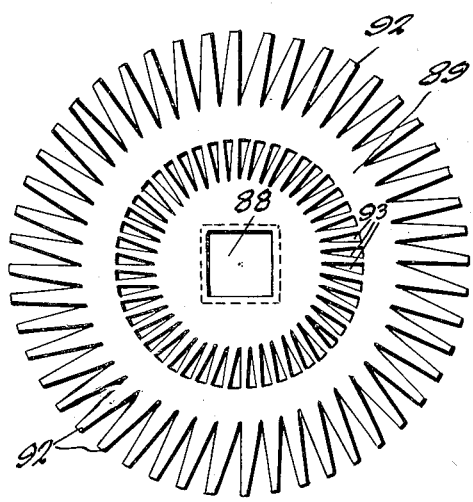
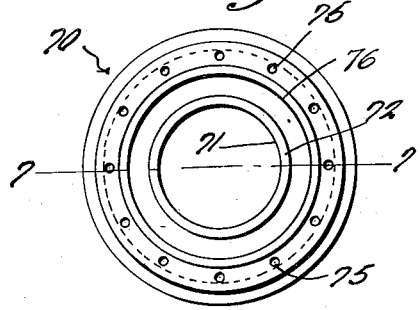
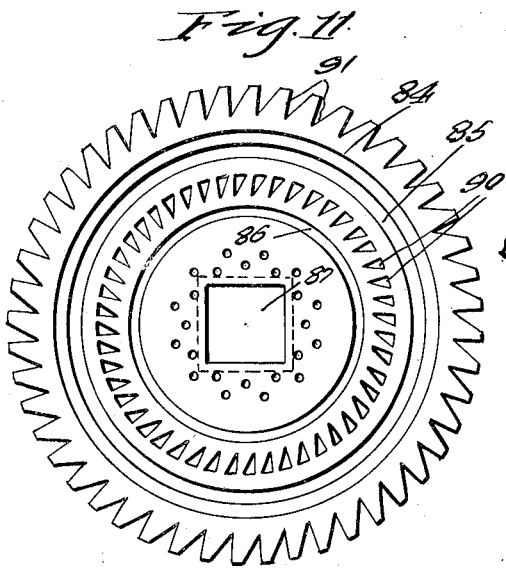
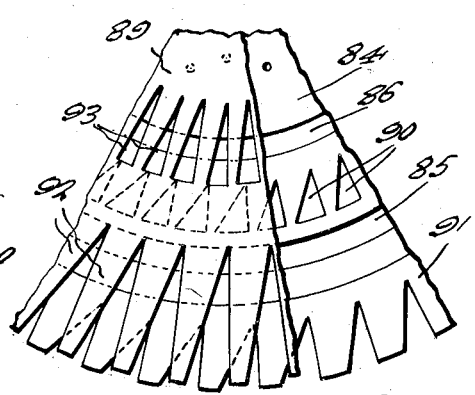
Inventor
Paul Gervasi
By Clarence A. O'Brien
Attorney March 7, 1933.  P. GERVASI  1,899,951
BURNER
Filed May 9, 1931   5 Sheets-Sheet 4
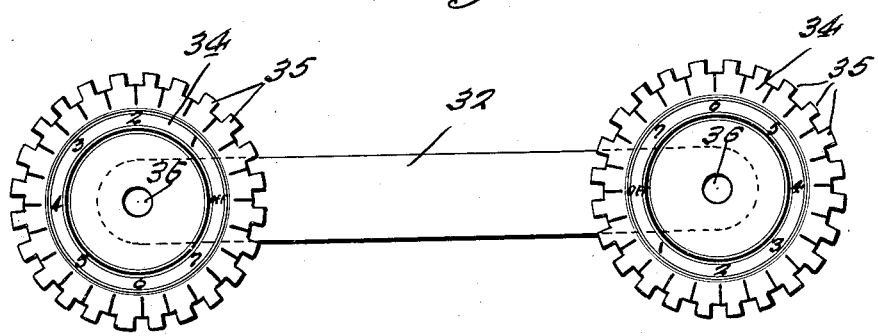
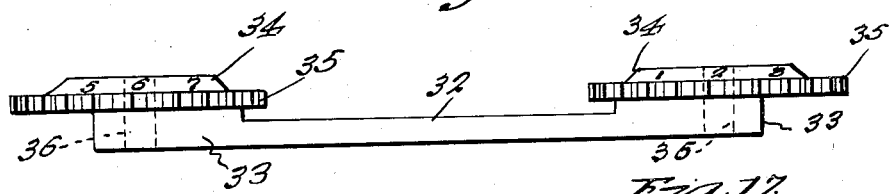
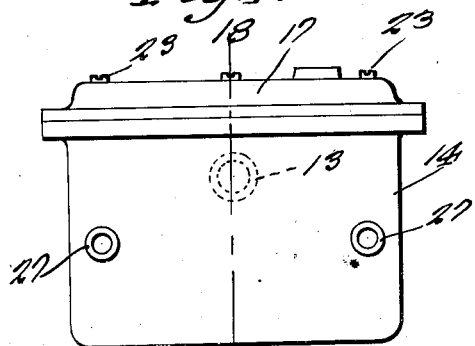
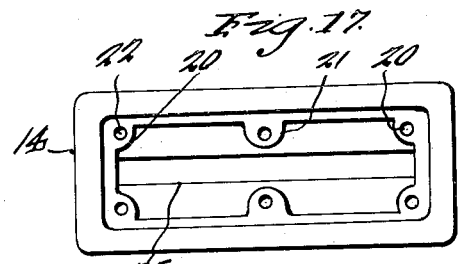
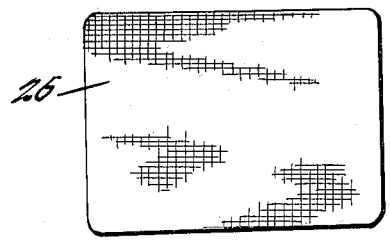
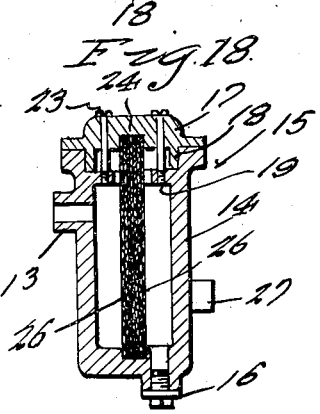
Inventor
Paul Gervasi
By Clarence A O'Brien
Attorney

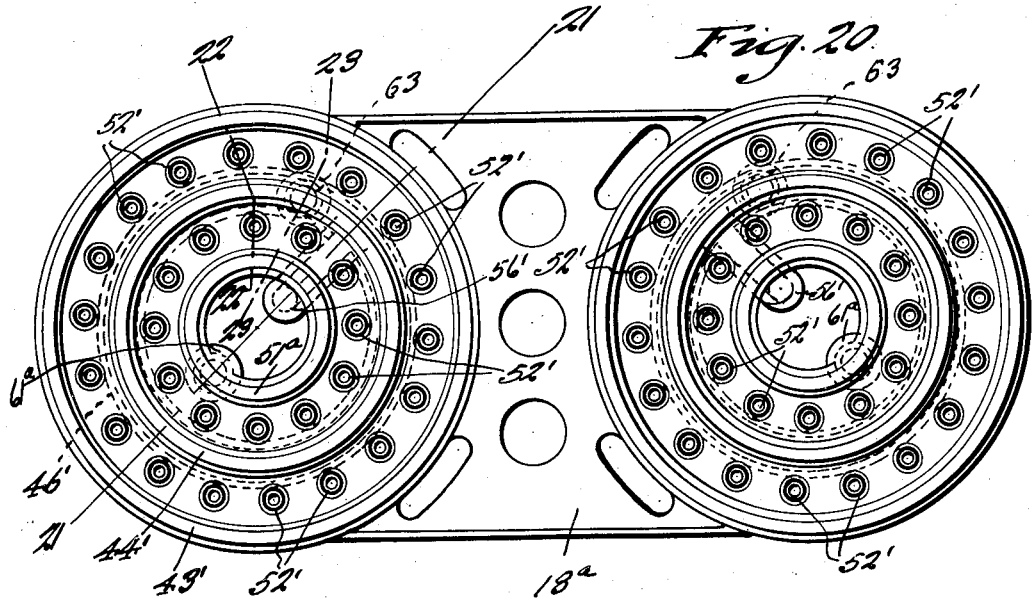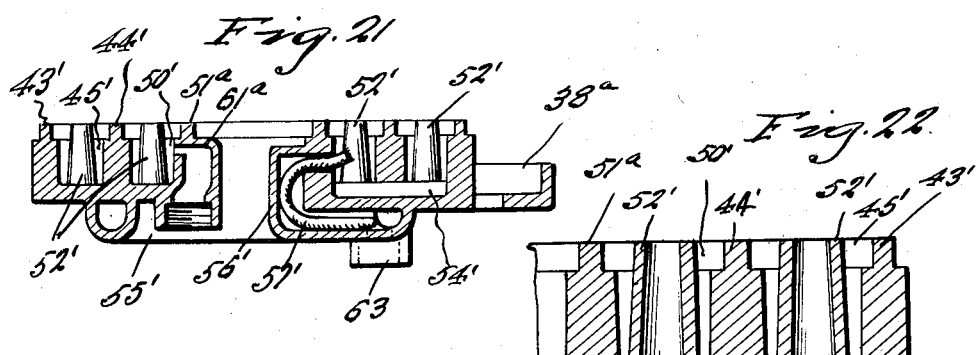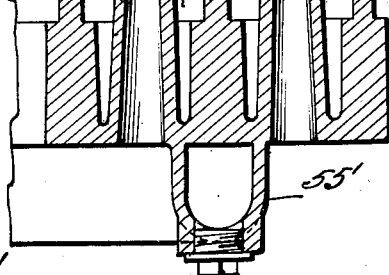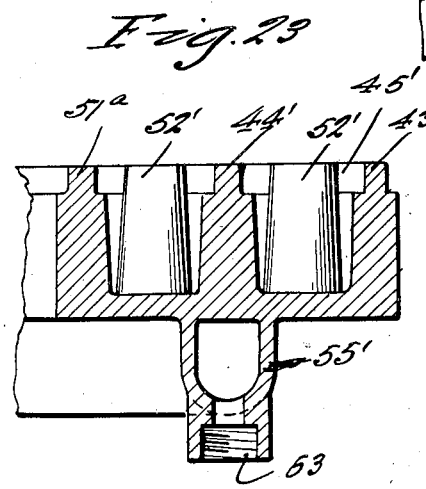

Patented Mar. 7, 1933

1,899,951

UNITED STATES PATENT OFFICE

PAUL GERVASI, OF WATERBURY, CONNECTICUT

BURNER

Application filed May 9, 1931. Serial No. 536,272.

This invention relates to new and useful improvements in burners of the liquid fuel type, and the principal object of the invention is to provide a burner which will have marked increase in efficiency over the conventional types of burners now in general use.

Another important object of the invention is to provide a liquid fuel burner which can be controlled in an easy, convenient, and exacting manner.

Still another important object of the invention is to provide a burner wherein such a mixture of air and fuel is acquired to the end that a greater heat will be attained while less fuel is being consumed.

These and numerous other important objects and advantages of the invention will become apparent to the reader of the following specification.

In the drawings:—

Figure 1 represents a side elevational view of the burner and its associated mechanism.

Fig. 2 represents a horizontal sectional view taken substantially on the line 2—2 of Fig. 1.

Fig. 3 represents a fragmentary longitudinal sectional view taken substantially on the line 3—3 of Fig. 2.

Fig. 4 represents a fragmentary sectional view taken substantially on the line 4—4 of Fig. 2.

Fig. 5 represents a fragmentary detailed sectional view taken substantialy on the line 5—5 of Fig. 2.

Fig. 6 represents a fragmentary vertical sectional view through one of the burner units of either form.

Fig. 7 represents a cross sectional view taken substantially on the line 7—7 of Fig. 8.

Fig. 8 represents a top plan view of the plate shown in Fig. 7.

Fig. 9 represents a fragmentary top plan view of the upper and lower deflector plates.

Fig. 10 represents a top plan view of the upper deflector plate.

Fig. 11 represents a top plan view of the bottom deflector plate.

Fig. 12 represents a vertical sectional view through one of the primary pre-heating barrels.

Fig. 13 represents a cross sectional view taken substantially on the line 13—13 of Fig. 12.

Fig. 14 represents a top plan view of the control with the valve actuating means removed.

Fig. 15 represents a side elevational view of the control means as shown in Fig. 14.

Fig. 16 represents a side elevational view of the filtering unit.

Fig. 17 represents a top plan view of the filtering unit casing with the cover removed.

Fig. 18 represents a vertical sectional view through the filtering unit taken substantially on the line 18—18 of Fig. 16.

Fig. 19 represents a side elevational view of the filtering pack.

Fig. 20 represents a top plan view with the cylinders removed, of a modification of the burner.

Fig. 21 represents a sectional view taken substantially on the line 21—21 of Fig. 20.

Fig. 22 represents a fragmentary enlarged sectional view taken substantially on the line 22—22 of Fig. 20.

Fig. 23 represents an enlarged fragmentary sectional view taken substantially on the line 23—23 of Fig. 20.

Referring to the drawings wherein like numerals designate like parts, it can be seen that numeral 5 represents the reservoir which is secured to the vertical post 6 by the retaining band 7, one end of which is provided with a clamp 8 for engaging the post 6 while the other end is opposed in spaced relation to the clamp 8, while a spring 9 is interposed between this last-mentioned end of the clamp band 7 and the said clamp for resiliently maintaining the band in place. The post 6 is supported from the base 10 and at its intermediate portion supports the float control unit 11, which is communicated with the reservoir 5 and with the feed line 12. This float-control unit 11 is of the gravity type, and forms no part of the present invention as such devices have been long in use and are of many types.

The feed line 12 is attached by way of the nipple 13 to communicate with the interior of the casing 14, of the filtering unit generally referred to by unit 15. The casing 14 is of rectangular shape and has a drain plug 16 in the closed bottom thereof, while the top thereof is open and supports the cover 17. This cover 17 is provided with a depending flange 18 on the bottom side thereof which depends into the casing 14 and rests upon the shoulder 19 which extends around the inner side of the casing 14 a slight distance downwardly from the top thereof.

The shoulder 19 at the corners of the casing 14 are provided with ears 20 similar to ears 21 at the intermediate portions of the side walls of the casing 14 and all of these ears are provided with threaded openings 22 for receiving the retaining screws 23 which are disposed downwardly through the cover 17 to secure the cover snugly in position over the upper end of the casting.

As is apparent in Fig. 18, the bottom side of the cover 17 is provided with a slot 24 therein, overlying the slot 25 in the bottom of the casing 14. Obviously, when the filtering tank 26 is arranged vertically within the filtering unit, the lower edge thereof will be received by the slot 25, while the upper edge thereof will engage into the slot 24 of the cover 17 when the cover 17 is properly disposed over the casing.

Fuel supplied through the line 12 enters the casing 14 at one side of the filtering pack 26 and after filtering through this pack passes outwardly of the filtering unit through the nipple 27 and pipes 28.

The filtering pack 26 is made up of five or six (more or less) sheets of mesh material, varying in mesh, from a large mesh on the inlet side of the casing, to a very fine mesh on the outlet side of the casing, so that the liquid fuel is clearly filtered before it is permitted to pass toward the burner generally referred to by numeral 28.

At this point, it can be observed, that the burner spoken of is of the double-unit type and obviously one or more of these units can be employed without in any manner affecting the merits of this invention. However, in view of certain novel features in connection with a dual type of burner, such a type of burner is illustrated in the drawings, but simply for illustrative purposes.

In each of the pipes 28 is a blow controlling valve 29 which includes an upwardly disposed stem 30. The means for regulating the flow of fuel through these pipes 28 is generally referred to by numeral 31 and includes an elongated bridge member 32 enlarged at each end as at 33, and provides on each enlarged end portion 33 with a dial 34 having a toothed periphery 35. A bore 36 extends upwardly through each enlarged portion 33 and each dial 34 to receive the corresponding valve stem 30. The enlarged portion 33 rests upon or is suitably secured to the shell portions of the valves 29. The dials 34 have suitable graduating characters thereon to permit intelligent setting of the corresponding valves 29. The upper end of each stem 30 is provided with a crank handle 36' on which a pivotally mounted pawl or detent 37 is mounted and this pawl or detent is engageable with the toothed periphery 35 of the corresponding dial 34 to retain the valve in any desired set position.

Fig. 2 of the drawings, shows one type of burner, while Fig. 21 shows a modification of this burner. However, the foregoing features of the invention predominate in each form.

The form of the invention shown in Fig. 2 and the succeeding figures will now be described.

This form of the invention includes an elongated plate on each end portion of which is a burner unit. This plate is denoted by numeral 38 and has three threaded openings 39 transversely spaced at the intermediate portion thereof, one of which is to receive the supporting port 40, which rises from the base 41. This base 41 and its leveling screws 42 are of conventional construction and form no part of the present invention.

As both burner units are of the same construction, a description of one will suffice for both. The burner units include a primary upstanding annular flange 43 in complement to a secondary upstanding annular flange 44 to provide a burner channel 45 within which the wick (see Fig. 3) 46 is placed.

An upstanding flange 47 is spaced from the flange 44 by the fuel by-passes 48 and is complemental to the flange 49 to provide the burner channel 50 for the reception of the wick 50''. As is clearly shown in Fig. 3, an upstanding flange 51 is provided concentrically inwardly of the flange 49 and has bosses 52 on the open side thereof through which air passageways 53 are provided. These passages 53 extending from the atmosphere, communicate with the aforementioned burner channels 50, while the burner channel 50 communicates with the burner channel 45 by way of the passageway 54 extending through the by-pass 48, whereby fuel admitted to the channel 50 from the secondary preheater conduit 55 will pass to the burner channel 45.

As is clearly shown in Fig. 4, numeral 56 represents the by-pass between the conduit 55 and the channel 50 and from this conduit 55 and through the by-pass 56 extends the pilot wick 57 to terminate in the channel 50. The aforementioned flanges 44 and 47 are further connected by bosses 58 through which air ducts 59 extend to admit air to the burner channel 45.

A boss formation 60 extends from a point denoted by numeral 61, which is slightly above the top of the by-pass 56, downwardly below the burner unit and terminates in a threaded socket 62, to receive the upper threaded end of one of the pipes 63. This is the overflow feature of the invention, which will take care of surplus fuel in the event the wicks become extinguished from any accidental source.

Numeral 63 represents the threaded socket opening to the conduit 55 which receives the threaded nipple 64 and the upper end of the primary pre-heating barrel 65 which is provided with a clean-out plug 66 in the bottom thereof, and a laterally disposed nipple 67 to which the aforementioned pipe 28 is attached by suitable means 68. (See Figs. 12 and 1.)

At this point, it can be seen that in the event the barrel 65 becomes congested or requires cleaning, the plug 66 can be removed and a suitable implement can be inserted to remove the sediment.

This is also true of the secondary pre-heater 55 which is provided with clean-out plugs 69 which can be removed to permit the cleaning of the interior of this feed conduit.

Supported up the flange 51 is a plate generally referred to in Fig. 8 by numeral 70. This plate has a central opening 71 and an upwardly and downwardly extending flange at this edge portion of the plate denoted by numeral 72. This flange 72 engages on the outside of the aforementioned flange 51, while the plate proper rests upon the said flange 51.

The periphery of this plate 70 is provided with a downturned flange 73, which is equipped with an outwardly disposed circumferentially extending rib 74. The plate is provided with a multiplicity of openings 75 adjacent the flange 73 and between these openings 75 and the flange 72 is an upstanding flange 76. The upper edge portions of the flanges 43, 44 and 47 are reduced to provide shoulders for supporting the perforated cylindrical shells 77, 78, and 79 respectively. The shell 80 is supported by the rib 74 of the plate 70, while the perforated shell 81 is supported upon the plate 70 and against the flange 77. The innermost perforated shell 82 is also supported upon the plate 70 but against the flange 72.

As is clearly apparent in Fig. 3, the rib 74 is sufficiently spaced from the wick 50 so as to permit air to pass upwardly beneath the ignited edge of the wick. In this manner, combustion is greatly increased as the uprise of air serves to boost the flame and obviously, there is a much more efficient mixture of the air and the fuel which results in the economizing of fuel and the acquisition of a much hotter flame. Air also passes upwardly through the duct 59 to enter the burner channel 45 at a point below the upper edge of the wick 46 so that the same results are accomplished.

Suitable clips 83 can be employed in the burner channels to retain the wick in place, and this is principally required in the channel 50 to prevent the fuel to pass from the chamber 50 to the channel 45.

For disposition on the upper end of the shells 77, 78, 79, 80, 81 and 82, are the deflector plates clearly shown assembled in Fig. 6, and separately in Figs. 10 and 11. The bottom deflector plate 84 includes a pair of concentrically disposed downwardly pressed ribs 85 and 86. The rib 85 engages between the upper ends of the shells 78 and 79, while the rib 86 engages between the shells 80 and 81, thus closing the space between the upper ends of these shells.

The central portion of the plate 84 is provided with a polygonal-shaped well 87 for receiving the depending boss 88 on the upper deflector plate 89. As is clearly shown in Fig. 11, triangular-shaped openings 90 are arranged in an annular formation between the ribs 85 and 86 for location over the space between the shells 79 and 80. The edge portion of the plate 84 is bent upwardly and outwardly and serrated as at 91. These serrations, each has one edge portion on the line with the diameter of the plate, while its complementary edge is disposed obliquely with respect to the diameter. The outer ends of these serrations are blunt and extend outwardly a substantial distance further than the serrations 92, on the upper plate 89. The serrations 92 are of like construction and at a point inwardly of the serrations 92, the plate 89 is provided with triangular-shaped openings 93 arranged in annular formation and offset inwardly with respect to the openings 90 in the plate 84. Due to the length of the boss 88, the plate 89 will be supported in a position elevated above the plate 84.

The form of the invention shown in Figs. 20 to 23 inclusive shows a burner unit provided with concentric flanges 43', 44', and 51a. Between the flanges 43' and 44' is the burner channel 45', while between the flanges 44' and 51a is the burner channel 50. Extending upwardly from the bottom of the burner channels 45 and 50 are the upwardly tapering hollow teats 52' on the inner side of which, that is, between the teats 52' and the flange 44' in the channel 45', and between the teats 52' and the flange 44' and the channel 50 are arranged the wicks 46'.

The overflow passageway 61a is similar in construction to the overflow provision means in the other form of the invention, and the secondary annular conduit 55' is provided with the threaded socket 63 to receive the upper end of the aforementioned primary pre-heater barrel 65 (see Fig. 12). The pilot wick 57' extends from the conduit 55' through the fuel by-pass 56' to the burner channel 50 and as is clearly shown in Figs. in 20 and 21, the fuel can pass from this channel 50 through the passageway 54' to the outer channel 45.

The lower ends of the teats 52' open through the bottom of the burner units and through these teats a draft of air passes, issuing through the upper ends thereof to draw on the ignited wick which is located below the upper ends of the teats. This action of the air on the flange serves to accelerate the flame, and producing a more complete combustion, and in the end economizing on fuel, while at the same time offering more efficiency than conventional types of burners, now on the market.

Obviously, the pilot wick 57' will be kept burning at all times when the valves 29 are set partly open. In the event of overflow either in the form of the invention shown in Fig. 2, or in the form of the invention shown in Fig. 20, the fuel passes downwardly through the pipe 63 to a receptacle 96 which is connected by way of the link 97 to a valve 98 in the pipe 28. Obviously, when a predetermined amount of fuel enters the receptacle 96, the weight thereof will pull down on the valve control element of the valve 98 and cause the valve 98 to close off the supply of fuel through the pipe 28.

The burner can only again be started by emptying the receptacle 96.

It is obvious, that the manner in which the air is mixed with the fuel and the location in which this air mixes with the fuel and in respect to the ignition portion of the wick serves to increase combustion, and at the same time economize on fuel, and still toward this end, the deflector plants 84 and 89 are provided on the upper ends of the cylindrical channels to concentrate the heat and to insure complete combustion.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

A baffle for liquid fuel burners employing co-axial perforated spaced shells comprising a pair of superimposed serrated plates for disposition upon the shells, the upper plate being provided with a detachable connection to the lower plate, and a dependency on the lower plate for snug removable disposition between the shells.

In testimony whereof I affix my signature.

PAUL GERVASI.